United States Patent [19]

Rathi

[11] Patent Number: 4,875,050
[45] Date of Patent: Oct. 17, 1989

[54] GENERALIZED DOPPLER MATCHED BINARY PULSE COMPRESSOR

[75] Inventor: Dev D. Rathi, Los Angeles, Calif.

[73] Assignee: ITT Gilfillan, a division of ITT Corporation, Van Nuys, Calif.

[21] Appl. No.: 155,423

[22] Filed: Feb. 12, 1988

[51] Int. Cl.[4] .......................... G01S 7/32; G01S 7/44; G06F 7/38

[52] U.S. Cl. .................................... 342/195; 342/201; 364/724.11

[58] Field of Search .............. 342/116, 194, 195, 196, 342/201; 364/724.11, 729, 730

[56] References Cited

U.S. PATENT DOCUMENTS

| | | | |
|---|---|---|---|
| 3,167,738 | 1/1965 | Westerfield | 364/724.11 |
| 3,406,396 | 10/1968 | Bosc et al. | 342/109 |
| 3,898,446 | 8/1975 | Vatz | 364/730 |
| 3,945,010 | 3/1976 | Wardrop | 342/189 |
| 3,956,623 | 5/1976 | Clark et al. | 364/729 |
| 4,176,351 | 11/1979 | DeVita et al. | 342/111 |

Primary Examiner—Thomas H. Tarcza
Assistant Examiner—Gilberto Barrón, Jr.
Attorney, Agent, or Firm—Thomas N. Twomey; Mary C. Werner

[57] ABSTRACT

A Doppler matched binary pulse compressor having means to initiate operation, means to generate a Doppler matched filter bank, means to compress the pulses from the Doppler matched filter, either linear or soft limited, means to estimate the signal phase in real time and means to select overall optimal filters in real time. The foregoing includes a phase estimator having a quadrant detector and means to scale the quadrature components while preserving the signal phase, means to reduce accuracy computations to 45° or less of the first quadrant, and means to reconstruct the phase to place the signal in the proper quadrant.

3 Claims, 8 Drawing Sheets

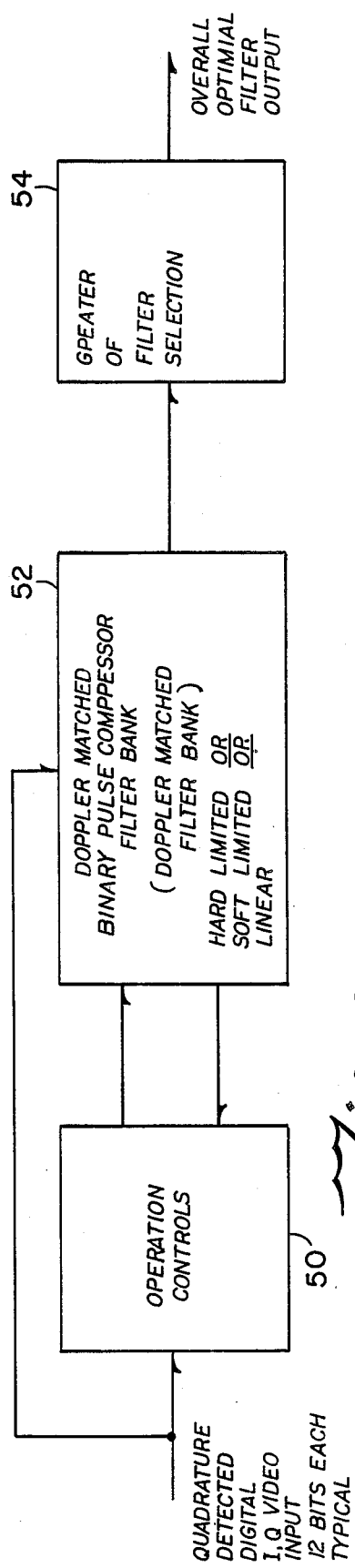
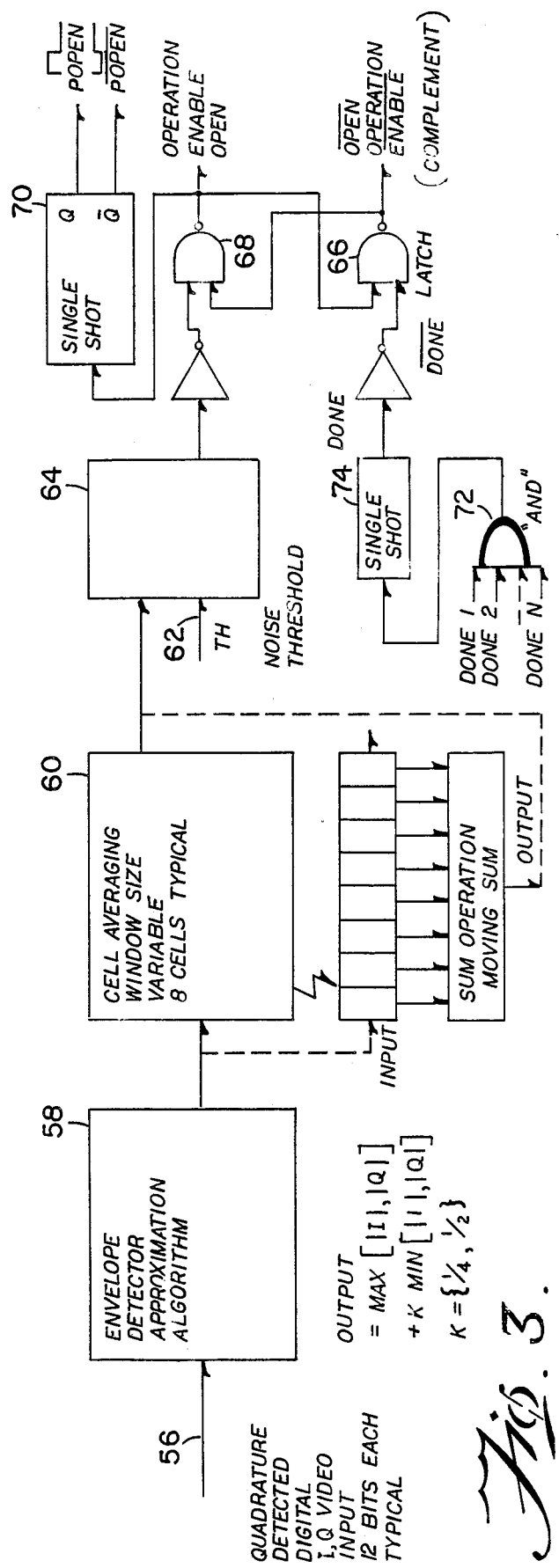

GENERALIZED DOPPLER MATCHED BINARY PULSE COMPRESSOR

BACKGROUND OF THE INVENTION

1. Field of the Invention

This invention relates to pulse compressors, and more particularly to a generalized Doppler matched binary pulse compressor which may employ either hard or soft limited signals.

2. Description of the Prior Art

In the prior art, a soft limited digital pulse compressor such as may be employed in the subject invention is disclosed in U.S. Pat. No. 4,679,210, Rathi, and assigned to the assignee of the present invention. It is also described in an article entitled "Detection Performance of Soft Limited Phase Coded Signals", by Dev D. Rathi, in the IEEE Transactions on Aerospace and Electronics Systems, Vol. AES-22, No. 1, January 1986, pages 79–86.

Other prior art in the general field is as follows. U.S. Pat. No. 4,231,100, Eggermont, relates to an arrangement for filtering compressed pulse code modulated signals, and presents a digital filtering methodology for non-uniformly quantized pulse code modulated signals. U.S. Pat. No. 4,673,941, Van Der Mark, relates to a digital pulse compression filter and presents a methodology for implementing digital pulse compression filters. U.S. Pat. No. 4,674,104, Bachtiger, relates to a circuit arrangement for the regulation of a multi-channel pulse compression filter, and discusses the implemention technique for multi-channel pulse compression systems. U.S. Pat. No. 4,661,819, Lewis, relates to a Doppler tolerant binary phase coded pulse compression system, and uses selective matched filtering (pulse compression/correlation) to remove Doppler sensitivity before pulse compression. U.S. Pat. No. 3,474,342, McGee et al., relates to a signal translation system and uses a filter bank in the analog domain, and has no pulse compression. Each channel of the filter bank includes a crystal, a detector and an integrator. The present invention addresses a broader issue of Doppler matching and matched filtering which is different than either the digital filtering or the matched filtering. Hence, Eggermont, Van Der Mark and Bachtiger have no comparison since these address different problems. Eggermont talks about digital filtering for nonuniformly quantized pulse code modulated signals. Van Der Mark and Backtiger both talk about pulse compression (correlation/matched filtering).

Lewis and McGee present methodologies for removing Doppler sensitivity which are different in time and concept. In the present invention the Doppler sensitivity is reduced during the pulse compression process by selection of an optimum overall filter.

With regard to the phase estimator of the present invention, the conventional approach of table look-up using programmable read-only memories is suitable for small data size. Such an approach is impracticable, for a typical data size of 16 bits each X(I) or Y(Q) quadrature data since using a $2^{12}$ word PROM would require $2^{32} + 2^{12} = 2^{20}$ PROMS, an astronomical number. With regard to the phase detector, U.S. Pat. No. 4,623,873, Mehrgardt, relates to a digital phase detector using N stage pipeline, where N is the number of bits in the representation of X(I) or Y(Q). First (N−1) stages are alike. Each stage uses two multipliers, an adder, a subtractor, changeover switches and a PROM. Two basic equations are defined therefrom. The phase $\phi$ is computed as follows:

$$U = X + bY \tag{1}$$

$$V = X - bY \tag{2}$$

and $$\phi = \text{arctan of } U/V + \text{arctan } b \tag{3}$$

where $$b = 2^{-\gamma}; \gamma = 1, 2, \ldots n \tag{4}$$

Two methods described using the above equations vary only in implementation scheme used, N stage pipeline for high speed and recursive using uniprocessor for low speed applicatioons. While the end result may be the same, the important differences between the present invention phase estimator and Mehrgardt are as follows. There is a difference in concept as well as hardware. The phase estimator requires significantly less hardware. For example, for 16 bits each X(I), Y(Q) data the key hardware requirements for the subject invention and Mehrgardt are shown in Table A. In general, the hardware requirements for Mehrgardt using pipeline structure is directly proportional to data size, which in turn determines the length of the pipeline. In essence the subject invention is simple and easily adaptable to very high speed integrated circuit and application specific integrated circuit implementations.

TABLE A

| | HARDWARE REQUIREMENTS | |
|---|---|---|
| ITEM | PHASE ESTIMATOR | "DIGITAL PHASE DETECTOR" |
| 1. Pipeline stages | 4 Does not depend on data size | 16 (n stages) Depends on data size |
| 2. Multipliers | 3 Does not depend on data size/length of pipeline | 45 (2×(n-1)) Depends on data size/ length of pipeline |
| 3. Adders/ Subtractors | 3 Does not depend on data size/length of pipeline | 45 (2×(n-1)) Depends on data size/ length of pipeline |
| 4. Word PROMS (Table Lookup) | 4 fixed | 15 (n-1) Depends on data size/ length of pipeline |

It is accordingly an object of the present invention to provide a generalized Doppler matched binary pulse compressor.

It is another object of the invention to provide such a pulse compressor while minimizing the number of filter components.

It is still another object of the present invention to provide such a pulse compressor using an improved phase estimator.

Still another object of the present invention is to provide such a binary pulse compressor employing the steps of envelope detection, phase estimation, vector rotation, scaling while preserving the phase correlation (pulse compression/ matched filtering), and greatest-of-filter selection.

SUMMARY OF THE INVENTION

The foregoing and other objects are accomplished by providing a Doppler matched binary pulse compressor having means to initiate the operation thereof, means to generate a Doppler matched filter bank, means to compress the pulses from the Doppler matched filter either linear or soft limited, means to estimate the signal phase in real time and means to select overall optimal filters in real time.

A phase estimator is employed in the foregoing having a quadrant detector, means to scale the quadrature components while preserving the signal phase, means to reduce accuracy computations to 45° or less of the first quadrant, and means to reconstruct the phase to place the signal in the proper quadrant.

Other objects, features and advantages of the invention will become apparent from a reading of the specification, when taken in conjunction with the drawings, in which like reference numerals refer to like elements in the several views.

BRIEF DESCRIPTION OF THE DRAWINGS

FIG. 2 is a basic block diagram of the compressor of FIG. 1;

FIG. 3 is a diagram partly in block and partly schematic of the operations control of FIG. 2;

DESCRIPTION OF THE PREFERRED EMBODIMENT

Figure 1:
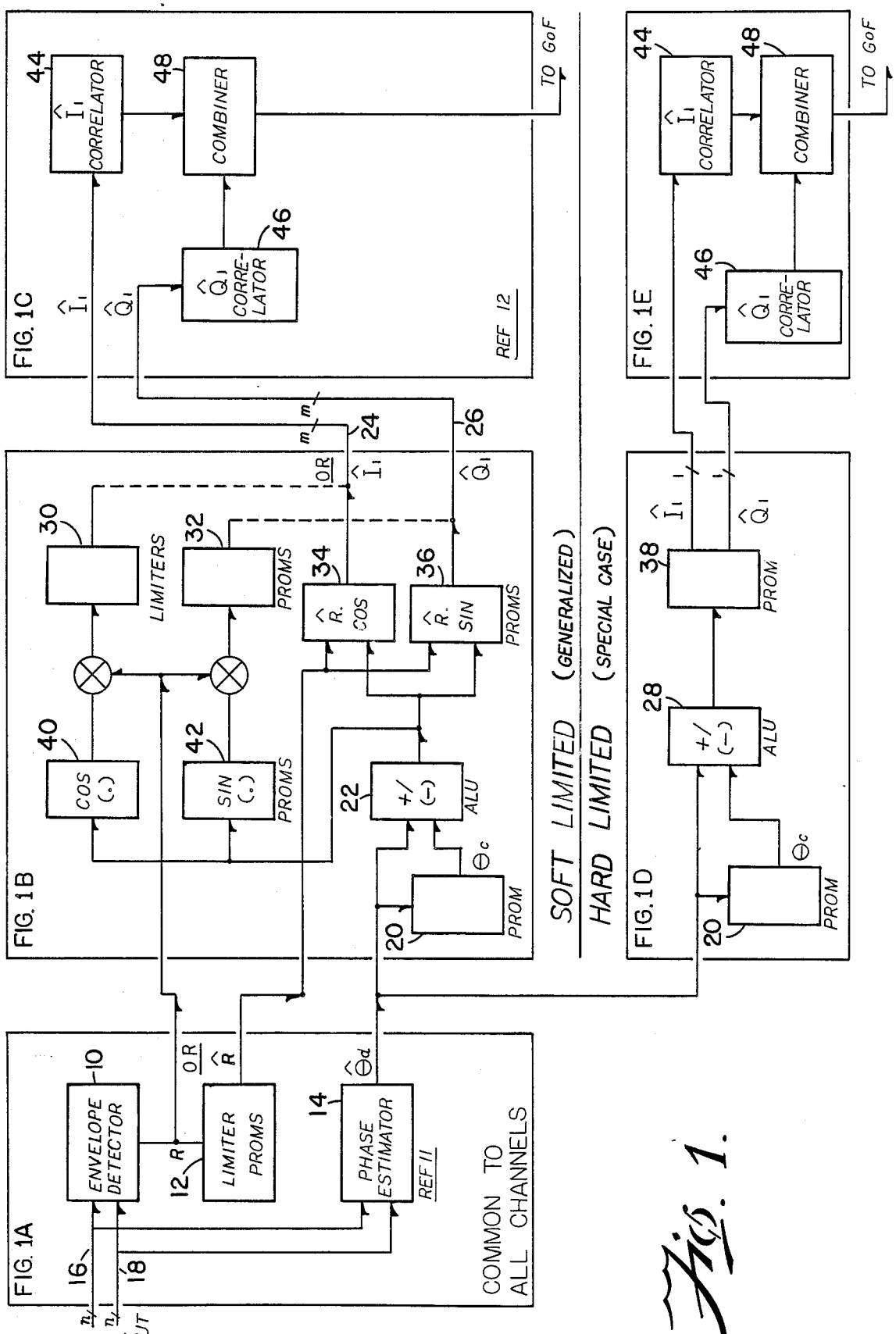
FIG. 1 is a block diagram of the generalized Doppler matched binary pulse compressor of the present invention.

Referring now to the drawings, the generalized Doppler matched binary pulse compressor of the present invention is simple and overcomes the disadvantages of FFT type filtering. The approach is generlized in the sense that it can be used for both hard limited and soft limited signals. The soft limited pulse compressors are desirable in high performance radar systems, for example, to detect multiple targets with high target ratios and fraction of a code length target separation. Each filter in the filter bank is matched to the Doppler frequency of interest. One need generate only as many Doppler matched filters as required to meet a given system performance requirement. Each pulse compressor channel is identical and therefore is very attractive for use in fault-tolerant enviroments. Furthermore, almost maximally flat filter bank response characteristics are achievable even on systems with long phase codes and correlator length. Referring to FIG. 1, three basic steps are required to achieve Doppler matched binary pulse compression. FIG. 1A illustrates three elements: an envelope detector 10, a limiter 12 and a phase estimator 14, which is common to all channels. I and Q inputs 16 and 18, respectively, go to the envelope detector 10 and the phase estimator 14. Two basic operations are required: obtaining the magnitude R at the output of envelope detector 10, and the $\hat{R}$ at the output of limiter 12. The size of $\hat{R}$ depends upon the word size of the pulse compressor unit, the magnitude R is obtained by using a magnitude approximation:

$$R = \text{MAX}[|I|, |Q|] + k \, \text{MIN}[|I|, |Q|]$$

where $|.|$ means the absolute value and the value of k for all practical purposes is $k=(\frac{1}{4}, \frac{1}{2})$. The phase estimate $\hat{\Theta}_d$ at the output of the phase estimator 14 is obtained by using a technique to be described further with regard to FIG. 8. Again, note that this block is common to all filters in the filter bank.

In step 2 in FIG. 1B, Doppler matching operation is achieved by adding (subtracting) Doppler correction increment $\Theta_c$, the output of PROM lookup table 20 to the phase estimate $\hat{\Theta}_d$, the output of phase estimator 14, in the adder/subtractor 22. The phase estimate $\hat{\Theta}_d$ is a function of Doppler velocity itself ($f_d = 2 v_t f_o/c$; where $f_d$ equals Doppler frequency in Hz; $v_t$ equals target velocity in meters/sec.; $f_o$ equals transmission frequency in Hz; and $c = 3 \times 10^8$ meters/sec.), and $\phi$, the incident phase which in turn is a function of wavelength. The Doppler correction increment $\Theta_c$, however, depends upon the Doppler match frequency of interest. For instance, for a Doppler matched frequency of $6 \times 10^3$ Hz, the Doppler correction increment $\Theta_c$ for a 1.5 microsecond chipwidth $\tau$ would be $$\Theta_c = K \times 18 \times \pi \times 10^{-3} \, \text{Mod} \, 2\pi \, \text{Radians},$$

where $$\pi = 3.14 \text{ and } K = 0, 1, \ldots f(R_m \tau),$$

where $f(R_m \tau)$ is a function of maximum range and chipwidth. The new coordinates $\hat{I}_1$ and $\hat{Q}_1$ are functions of transformed magnitude $\hat{R}$, phase estimate $\hat{\Theta}_d$ and Doppler correction $\Theta_c$, and appear on outputs 24 and 26 of FIG. 1B. These are obtained by using ALU 22 in the soft-limited generalized case, or ALU 28 in the hard-limited configuration of FIG. 1D, and table lookup PROMS/multipliers 30, 32, 34 and 36 in the soft-limited case and 38 in the hard-limited case. This block FIG. 1B in the soft-limited case, and FIG. 1D in the hard-limited case, is required for each filter in the filter bank.

The output of ALU 22 is also fed to the inputs of cosine and sine PROMs 40 and 42, the outputs of which are combined with the output R of envelope detector 10 and fed to limiters 30 and 32, respectively.

The final step in achieving Doppler matched filtering is carried out in FIG. 1C for the soft-limited case, or FIG. 1E for the hard-limited case. Output 24 $\hat{I}_1$ is fed to a correlator $\hat{I}_1$ 44, and output $\hat{Q}_1$ to a correlator $\hat{Q}_1$ 46, the outputs of which are combined in combiner 48. The mechanization of the soft-limited digital binary pulse compressor is disclosed in greater detail in U.S. Pat. No. 4,679,210, Rathi, referenced above. The output of FIG. 1C is used in the greatest-of-filter section, not shown in FIG. 1, to obtain the bandpass characteristic as will be discussed further in connection with FIG. 9.

For the hard-limited case, FIG. 1E employs similar correlators 44 and 46 and a combiner 48. It is noted that this block is required for each filter in the filter bank, and hard-limiting is a special case. The above operations can be pipelined for high data rates. Typical components used are as follows: ALUs—54S381; INVERTERs—54S04; ANDs—54S08; NANDs—54S00; or the equivalents. The PROMs used were INTEL 32K (4K×8), 3632 BIPOLAR PROMs, or the equivalent. The CORRELATORs—TRW 64 bit digital CORRELATOR TDC 1023 J or the equivalent; the REGISTERs—54S75 and 54S74, or equivalents, and the MULTIPLIERs—TRW HJ Series, MPY 12HJ, or equivalent.

In essence, the generalized Doppler matched binary pulse compressor is expandable, maintainable, programmable, and independent of the correlator device length. Furthermore, one need generate only as many filters as needed to meet the given system performance requirements.

FIG. 2 shows a generalized Doppler matched binary pulse compressor in even more basic block diagram, which will be detailed in FIGS. 3–9. The basic block diagram of FIG. 2 is comprised of operation controls 50, Doppler matched binary pulse compressor filter bank 52, and greatest-of-filter selection 54. As previously disclosed, the Doppler matched filter bank contained in 52 may be either hard-limited or soft-limited. The operations control block 50 controls the start/stop operations of the Doppler matching sequence. Dopper matching, together with binary pulse compressor, form the block 52 which removes the Doppler from the input video and provides the transform coordinates to the binary pulse compressor. The output of each Doppler matched binary pulse compressor filter 52 forms the input to the greatest-of-filter selection 54. The output of greatest-of-filter selection 54 is the optimum response over all filters in the Doppler matched binary pulse compressor filter bank.

FIG. 3 illustrates the details of the operation control block 50 of FIG. 2, which is common to all filters in the Doppler matched filter bank and controls the start and stop of the Doppler matching sequence. The input video 56 is envelope detected in envelope detector 58 using a magnitude approximation algorithm:

magnitude=MAX[$|I|$, $|Q|$]+$k$ MIN[$|I|$, $|Q|$]

where $k=\frac{1}{4}$ typical and $|.|$ implies absolute value. The moving average of n cells is used for detection of signal presence in cell averaging window size block 60, with $n=8$ being typical. For detection of the signal presence by comparing with the false alarm threshold, input 62 to comparator 64. This threshold crossing sets the latch 66 which in turn generates operation enable term OPEN or OPEN, the complement of operation enable at the output of gates 68, and 66, respectively. The latch 66 also generates an operation enable pulse POPEN (POPEN) through single shot 70. These are used in the Doppler matched filter bank of FIGS. 5 and 6. The latch 66 is reset by a pulse DONE which is generated upon receiving completion signals from all the filters in the Doppler matched filter bank at the inputs of AND gate 72, transmitting a signal through single shot 74. The false alarm threshold is set to the desired false alarm rate $P_{fa}$, which is $10^{-3}$ false alarms per second typically.

Figure 4:
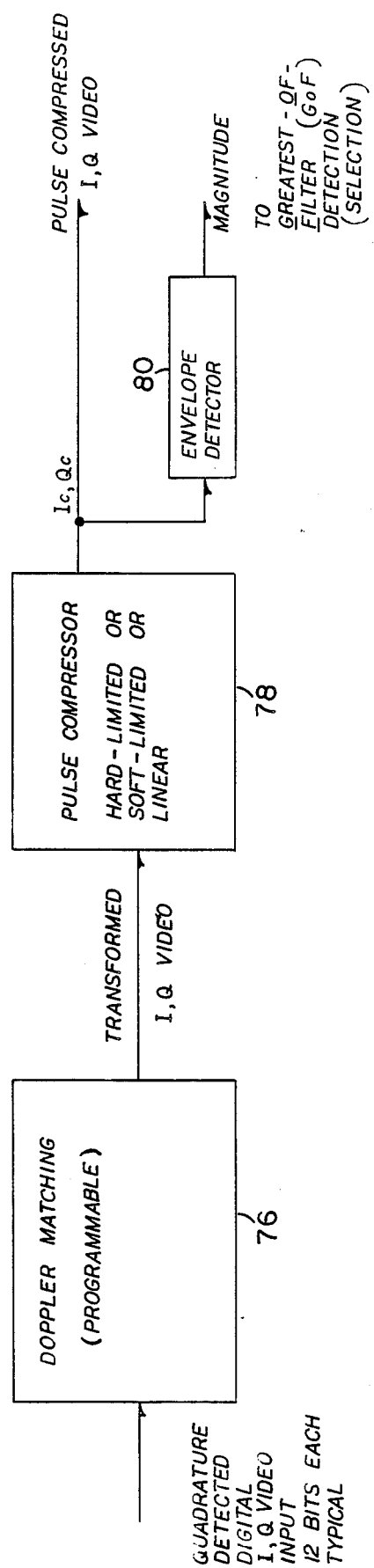
FIG. 4 is a block diagram of the Doppler matched filter of FIG. 2.
Figure 5:
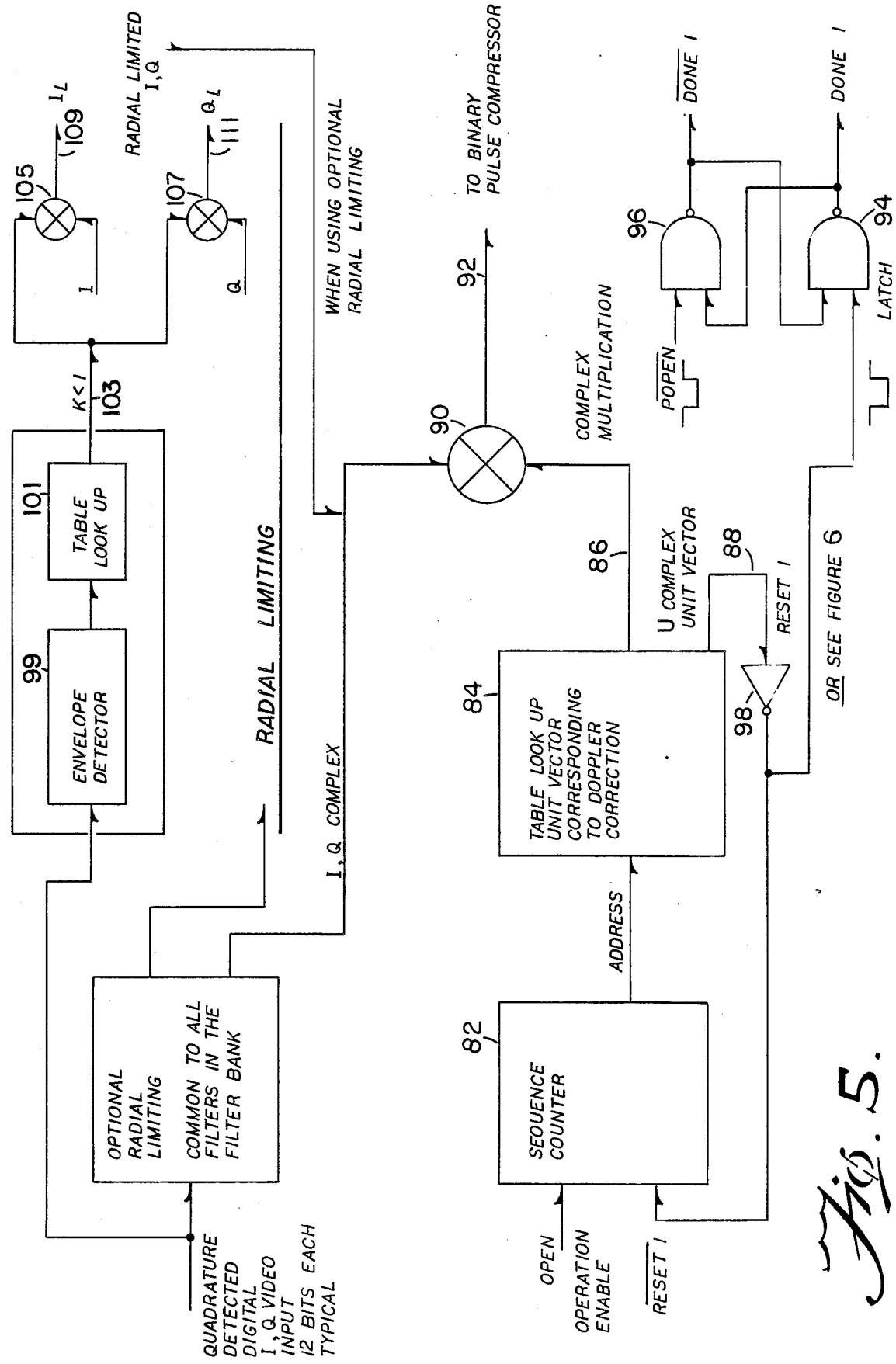
FIG. 5 illustrates Doppler matching in x,y coordinates in the implementation of FIG. 4, partly in block and partly schematic.
Figure 6:
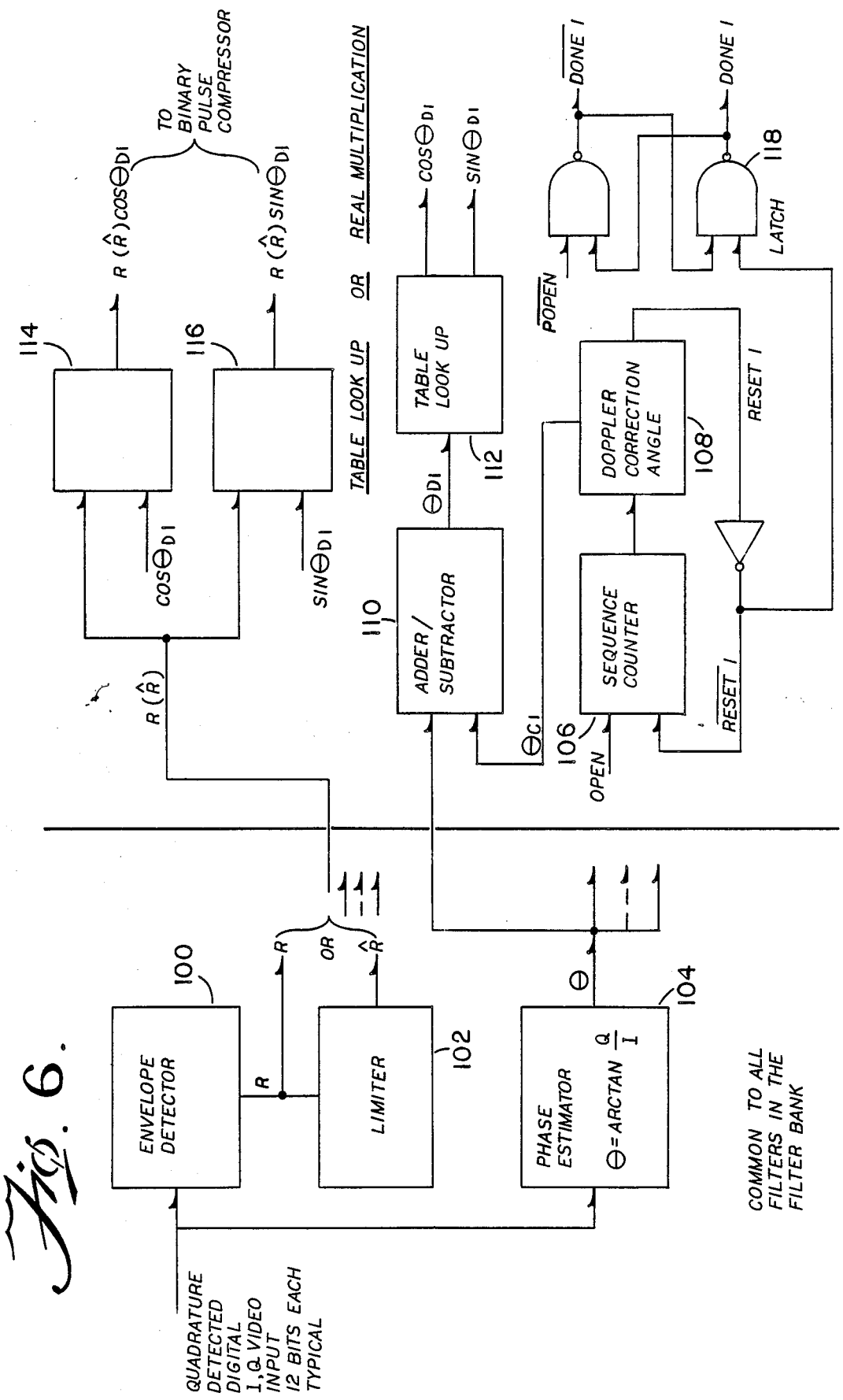
FIG. 6 illustrates Doppler matching in R,$\Theta$ coordinates for the implementation of FIG. 4, again partly in block and partly schematic.

FIG. 4 illustrates the basic block diagram of each Doppler matched filter in a Doppler matched filter bank. Each Doppler matched filter is comprised of a Doppler matching 76 and a binary pulse compressor 78. The Doppler matching in x,y coordinates is illustrated in FIG. 5 and in R,Θ coordinates is illustrated in FIG. 6. The binary pulse compressor 78 may be soft-limited or hard-limited as mentioned previously. The output of binary pulse compressor 78 is $I_C Q_C$, the pulse compressed I and Q video, and is transmitted through envelope detector 80 to provide a magnitude pulse to the greatest-of-filter detector.

FIG. 5 illustrates Doppler matching in x,y coordinates. Upon receiving start-up signal OPEN, the sequence counter 82 advances to the next step at each clock pulse and generates an address for the table lookup PROM 84, which provides a unit vector on output 86 corresponding to the Doppler incremental correction step, and also provides a reset signal on output 88. The Doppler component is removed by performing complex multiplication using optionally radial limited inputs IQ video and the unit vector provided by the PROM 84 in multiplier 90, the output of which forms the input to the binary pulse compressor 92. The status latch 94 is set by a pulse POPEN 96 and reset by RESET 1, 98 at the completion of the programmed Doppler cycle. The output of latch 94 is used to terminate the Doppler matching sequence. Foregoing steps are common to all filters in the filter bank. Optional radial limiting may be achieved through envelope detector 99 and Table look-up PROM 101. The Table look-up PROM 101 provides a constant $K<1$ 103 which is used to scale down the input video components I,Q by real multiplication using multipliers 105 and 107. The output of these multipliers 109 and 111 replace the I,Q inputs respectively to the complex multipler 90. In passing, note that the radial limiting preserves the phase relationship between input video components I,Q.

FIG. 6 illustrates the Doppler matching in R,Θ coordinates. The input IQ video is envelope detected in detector 100, using the magnitude approximation algorithm previously discussed. This magnitude T is then optionally limited in limiter 102 to magnitude R̂ using a table lookup PROM.

Figure 7:
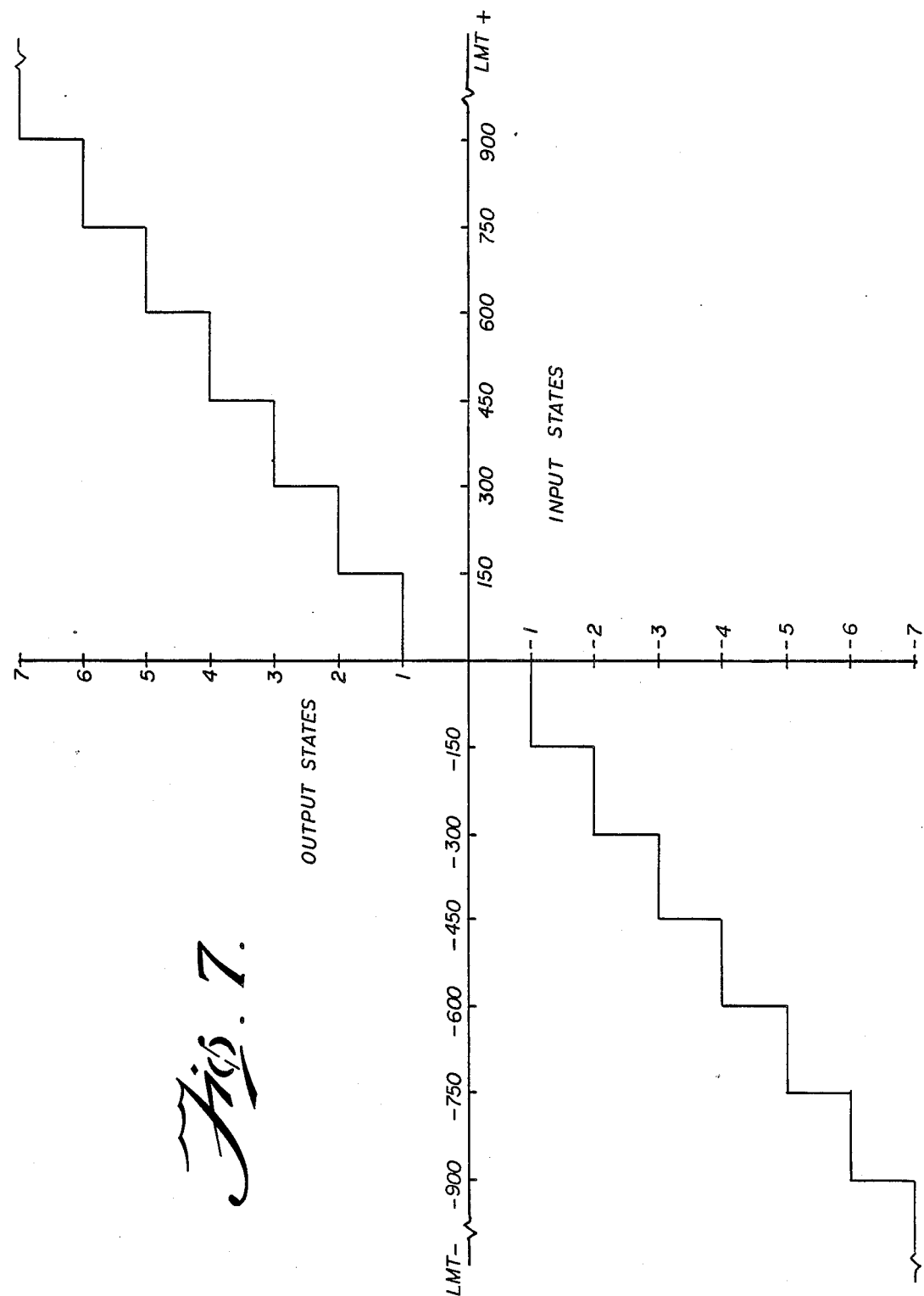
FIG. 7 is a graph of input states versus output states illustrating the limiter input/output characteristics for a four-bit limited filter.

A typical limited input/output characteristic is shown in FIG. 7. The phase estimator 104 estimates the phase using a technique described in connection with FIG. 8. Upon receiving the startup signal OPEN, sequence counter 106 advances to the next step at each clock pulse and generates an address for the table lookup PROM 108, which in turn provides a Doppler incremental correction angle and the reset 1 completion signal. The Doppler component is removed by adding or subtracting this incremental Doppler angle to or form the phase estimate Θ in adder/subtractor 110, Θ coming from the output of phase estimator 104 and the incremental Doppler angle from table lookup 108. The resulting angle $\Theta_{d1}$ is used to generate COS $\Theta_{D1}$ and SIN $\Theta_{D1}$ in table lookup 112, using table lookup PROMs. The transform coordinates Î, Q̂ are generated by the product terms R(R̂) COS $\Theta_{D1}$ and R(R̂) SIN $\Theta_{D1}$ in multipliers 114 and 116, respectively. The product terms depending upon their sizes are obtained by real multiplication or table lookup PROMs in multipliers 114 and 116, the inputs to which come from envelope detector 100 or limiter 102 and table lookup 112. The status latch 118 is set by POPEN and is reset by RESET 1 provided by the PROM 108 at the completion of the program Doppler cycle. The output of latch 118 DONE 1 is used to terminate the Doppler matching sequence. The steps of envelope detector 100, limiter 102 and phase estimator 104 are common to all filters in the Doppler matched filter bank. The steps in the remainder of FIG. 6 are required for each filter in the Doppler matched filter bank. The outputs Î, Q̂ form the input to the binary pulse compressor from multipliers 114 and 116, respectively.

Figure 8:
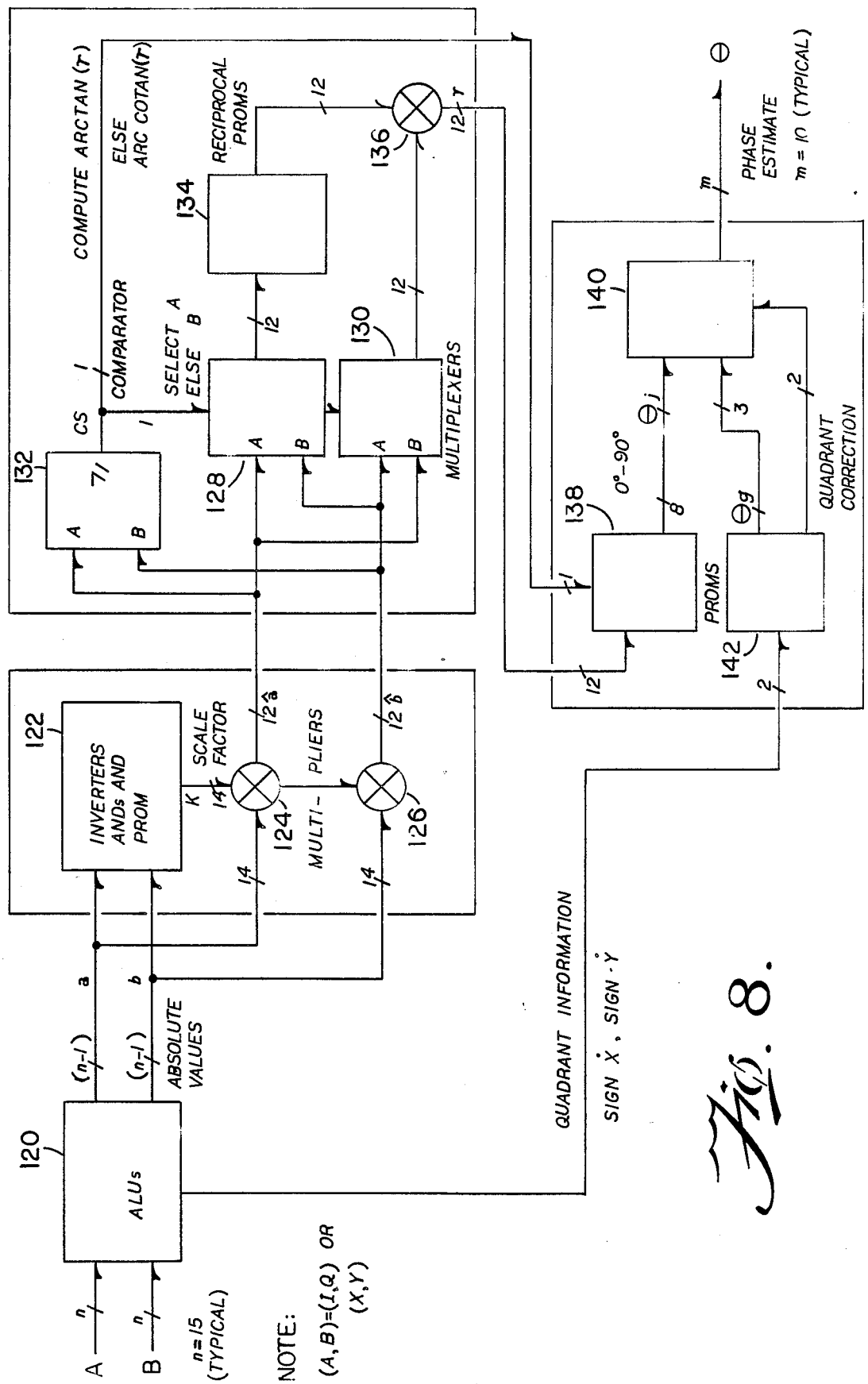
FIG. 8 is a block diagram of the phase estimator of FIG. 6 in more detail.

FIG. 8 shows the phase estimator 14, 104 of FIGS. 1 and 6, respectively, in more detail. In signal processing applications the input data is available in Cartesian coordinates $(A_n+jB_n)$; $j=\sqrt{-1}$. However, for filtering applications the quantity of interest is the phase $\Theta_n$ given by $\Theta_n=\arctan$ of $B_n/A_n$. The coordinate components $A_n$ and $B_n$ may represent direct input $(I_n+jQ_n)$, or may represent angle difference $(X_n+jU_n)$, derived by complex multiplication of two signals separated by one or more sample periods or interpulse periods. In passing we note that is the size of input data is n, an integer, then the size of $X_n(Y_n)$ as a result of the multiplication operation will be 2n.

While the conventional real time approach of table lookup using programmable read only memories is suitable for small data size, such an approach is impractical for a typical data size of 16 bit each X or Y, since using $2^{12}$ word PROMs would require $2^{32}/2^{12}=2^{20}$ PROMs. The phase estimator overcomes the disadvantage of the straightforward table lookup operation. The operations required are simple arithmetic, logical and feasible PROM table lookup. The novel features of this approach is the scale-up operation. The scale-up operation bounds the number seen by PROMs and the multiplier, so practical sizes of PROMs and multipliers can be used. Furthermore, the intermediate computations are reduced to the first quadrant to ensure the desired accuracy.

The block diagram of phase estimator is illustrated in FIG. 8. The phase estimate is obtained from its Cartesian coordinates A and B, using four basic steps. In the first step we obtain the absolute values of (a, b) and remember the quardant A and B where $a=|A|$ and $b=|B|$. This is done in ALUs 120.

The second step involves the scale-up of both a and b by the scale factor k which is determined by suppressing the leading zeros common to both a and b, in invertors, ANDs and PROM 122 and multiplying it in multipliers 124 and 126 by a and b, respectively, to obtain â and b̂.

In the next step we compute the ratio r, where $r=\hat{b}/\hat{a}$ when â is greater than or equal to b̂ and is equal to â/b̂ when â is less than b̂, the first where the comparator status equals 1, and the second where the comparator status equals 0. This is done by feeding the signals â and b̂ from multipliers 124 and 126, respectively, to multiplexers 128 and 130, respectively, and to comparator 132 to determine whether â is greater than or equal to b̂ or is less than b̂. The output of multiplexer 128 is fed through reciprocal PROMs 134 to multiplier 136, the other input of which comes from multiplexer 130 to derive r.

In the final step the outputs of 136 and 132 are fed to PROMs 138 to obtain an intermediate value of $\Theta_I$, such that $\Theta_I$ equals the arctan of r where CS=1, and the arc cotan or r for CS=0. Finally, the quadrant information from ALU 120 is added to $\Theta_I$ in ALU 140 to obtain the phase estimate $\Theta$ through PROM 142. The above operations can be pipelines for high data rates. Typical components used are as follows: ALUs—54S381 or equivalent; INVERTORs—54S04 or equivalent; ANDs—54S08 or equivalent; PROMs—INTEL 32K (4K×8), 3632 BIPOLAR PROMs or equivalent; COMPARATORs—54S85 or equivalent; MULTIPLEXERs—54S157; MULTIPLIERs—TRW HJ Series 16 bit and 12 bit multipliers MPY-16HJ, MPY-12HJ or equivalent; REGISTERs—54S74, 54S75 or equivalent.

Figure 9:
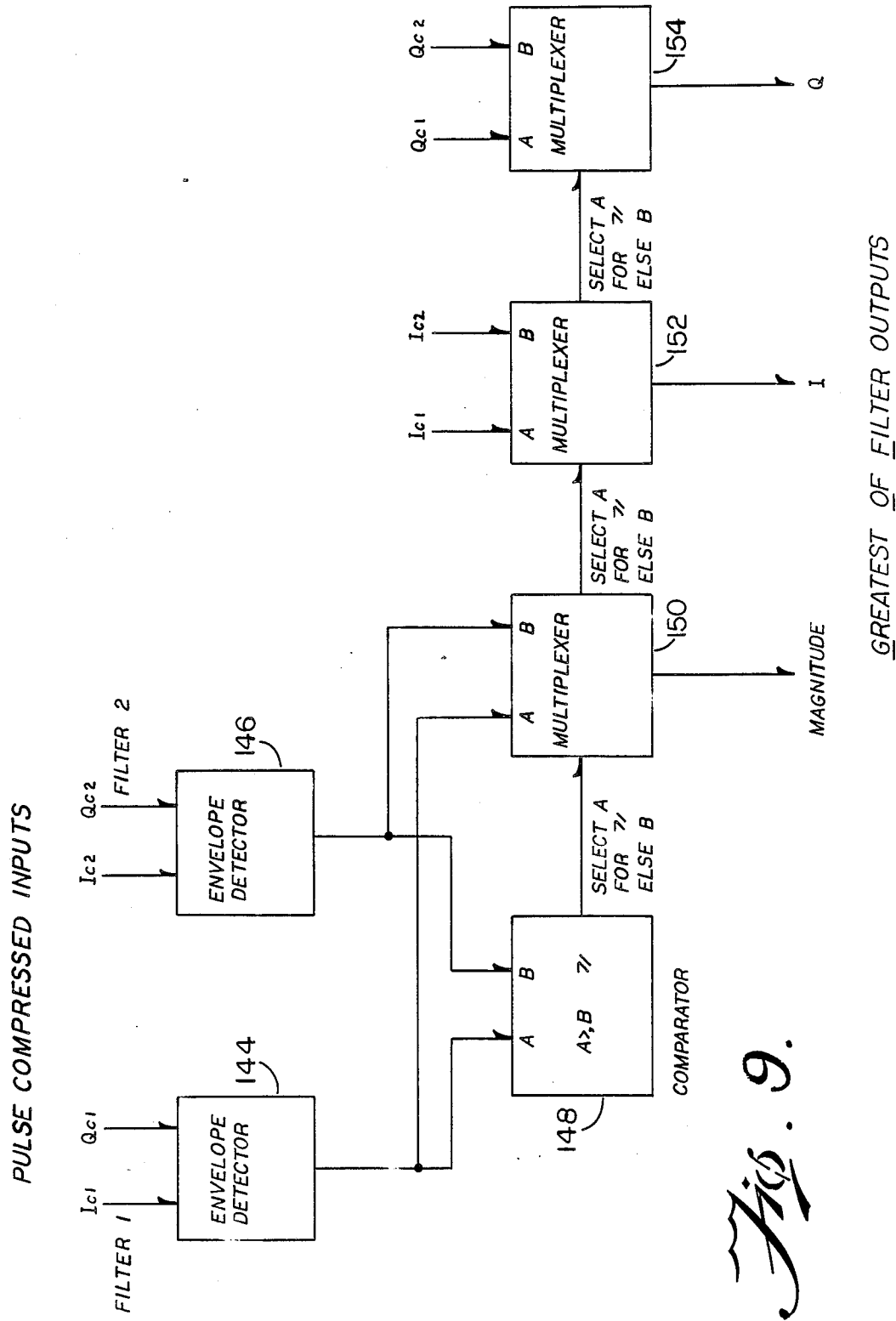
FIG. 9 is a block diagram of the greatest-of-filter selection network, shown for a two-filter case which may be employed in the block diagram of FIG. 2, but in greater detail.

FIG. 9 illustrates the greatest-of-filters selection technique for two filter case, which is general and can be expanded to n filter bank case. The pulse compressed I, Q video from each Doppler matched binary pulse compressor filter is envelope detected in envelope detectors 144, and 146, using the magnitude approximation algorithm previously disclosed. The pair-wise comparison in comparator 148 generates a control term select A which when true (high) selects A inputs of the multiplexers 150, 152 and 154, thereby giving the greatest-of-filter magnitude and the corresponding I, Q quadrature components. The greatest-of-filter output is the optimum filter response over all Doppler matched binary pulse compressor filters in the filter bank.

It will be obvious to those skilled in the art that various modification of the circuits employed to implement the embodiment illustrated may be made. While a particular embodiment has been discussed, it is understood that the invention is not limited thereto, and it is contemplated to cover any such modifications as fall within the true spirit and scope of the invention by the appended claims.

What is claimed is new and desired to be secured by Letters Patent of the United States is:

1. A doppler matched binary pulse compressor having means to initiate operation thereof; means to generate a doppler matched filter bank; means to compress the pulses from the doppler matched filter; means to estimate the input signal phase in real time including a phase estimator having a quadrant detector, means to scale the quadrature components while preserving the signal phase, means to reduce accuracy computations to 45° or less of the first quadrant, and means to reconstruct the phase to place the signal in the proper quadrant; and, means to select the overall optimal filter in real time.

2. The Doppler matched binary pulse compressor of claim 1 in which the means to compress the pulses from the Doppler matched filter is linear.

3. The Dopple matched binary pulse compressor of claim 1 in which the means to compress the pulses from the Doppler matched filter is soft-limited.

* * * * *